United States Patent
Baker

(10) Patent No.: US 11,209,521 B2
(45) Date of Patent: Dec. 28, 2021

(54) METHODS AND SYSTEMS FOR ESTABLISHING PROTOTYPE PULSES

(71) Applicant: The Boeing Company, Chicago, IL (US)

(72) Inventor: James B. Baker, Covington, WA (US)

(73) Assignee: THE BOEING COMPANY, Chicago, IL (US)

( * ) Notice: Subject to any disclaimer, the term of this patent is extended or adjusted under 35 U.S.C. 154(b) by 294 days.

(21) Appl. No.: 16/432,409

(22) Filed: Jun. 5, 2019

(65) Prior Publication Data

US 2020/0386856 A1 Dec. 10, 2020

(51) Int. Cl.
*G01S 7/295* (2006.01)
*G01S 7/53* (2006.01)
*G01S 7/4865* (2020.01)
*G01S 7/292* (2006.01)
*G01S 7/527* (2006.01)
*G01S 7/487* (2006.01)

(52) U.S. Cl.
CPC ........... *G01S 7/295* (2013.01); *G01S 7/2923* (2013.01); *G01S 7/487* (2013.01); *G01S 7/4865* (2013.01); *G01S 7/527* (2013.01); *G01S 7/53* (2013.01)

(58) Field of Classification Search
CPC ........ G01S 7/295; G01S 7/487; G01S 7/4865; G01S 7/53; G01S 7/2923; G01S 7/527
See application file for complete search history.

(56) References Cited

U.S. PATENT DOCUMENTS

| 8,491,481 B2 * | 7/2013 | Kabakov | A61B 5/4362 600/453 |
| 2007/0210848 A1 * | 9/2007 | Jimenez | H04B 1/7174 327/291 |
| 2009/0240157 A1 * | 9/2009 | Lian | A61B 5/7264 600/510 |
| 2010/0292606 A1 * | 11/2010 | Prakash | A61B 5/4023 600/554 |
| 2018/0113203 A1 * | 4/2018 | Warburton | G01T 1/17 |

\* cited by examiner

*Primary Examiner* — Arleen M Vazquez
*Assistant Examiner* — Terence E Stifter, Jr.
(74) *Attorney, Agent, or Firm* — McDonnell Boehnen Hulbert & Berghoff LLP

(57) ABSTRACT

Methods and systems for developing a prototype pulse in real-time. A method includes detecting, by a signal processor, a plurality of repetitive pulse signals carried in energy waves received at an antenna. The method further includes estimating time intervals corresponding to occurrences of the plurality of repetitive pulse signals and extracting a plurality of pulse signal segments detected by the signal processor during each of the time intervals over a time period. The signal processor selects a first pulse signal segment received during one of the time intervals and calculates respective time delays relative to the first pulse signal segment for each remaining pulse signal segment of the plurality of pulse signal segments. The signal processor then time-aligns the extracted pulse signal segments with the first pulse signal segment and averages the pulse signal segments to establish a prototype pulse signal.

20 Claims, 8 Drawing Sheets

METHODS AND SYSTEMS FOR ESTABLISHING PROTOTYPE PULSES

FIELD

The present disclosure relates generally to development of a prototype pulse signal in real-time, and more particularly, to methods of detecting, extracting, and correlating repetitive signals received at an antenna to establish the prototype pulse.

BACKGROUND

Receiver systems may be used to receive energy waves and detect and process signals carried in those energy waves. However, noise on a receiver system can significantly impact its ability to convey low amplitude signals. Applying a finite impulse response filter, such as a matched filter, can maximize the signal-to-noise ratio. Matched filters perform coherent correlation of direct and echo signal energy in order to further improve the signal-to-noise ratio of a signal over background noise. The matched filters are provided with a prototype pulse signal structure impulse response for implementation in the matched filter/correlator. Prototype pulses are predetermined and stored on receiver systems.

SUMMARY

In an example, a method of developing a prototype pulse signal in real-time by extracting a plurality pulse signal segments is described. The method comprises receiving, by an antenna, energy waves; detecting, by a signal processor, a plurality of repetitive pulse signals carried in the energy waves received at the antenna, wherein at least one aspect of each of the plurality of repetitive pulse signals repeats over a time period at a plurality of arrival times, estimating, by the signal processor, time intervals based on differences in the plurality of arrival times, wherein the time intervals correspond to occurrences of the plurality of repetitive pulse signals, extracting, by the signal processor, a plurality of pulse signal segments detected by the signal processor during each of the time intervals over the time period, selecting, by the signal processor, a first pulse signal segment of the plurality of pulse signal segments received during one of the time intervals, calculating, by the signal processor, respective time delays relative to the first pulse signal segment for each remaining pulse signal segment of the plurality of pulse signal segments, aligning, by the signal processor, each remaining pulse signal segment with the first pulse signal segment based on the respective time delays to create time-aligned pulse signal segments, and averaging, by the signal processor, the time-aligned pulse signal segments to establish a prototype pulse signal.

In another example, a system is described comprising an antenna, configured to receive energy waves, and a signal processor configured to carry out operations, the operations comprising: detecting a plurality of repetitive pulse signals carried in the energy waves received at the antenna, wherein at least one aspect of each of the plurality of repetitive pulse signals repeats over a time period at a plurality of arrival times, estimating time intervals based on differences in the plurality of arrival times, wherein the time intervals correspond to occurrences of the plurality of repetitive pulse signals, extracting a plurality of pulse signal segments detected by the signal processor during each of the time intervals over the time period, selecting a first pulse signal segment of the plurality of pulse signal segments received during one of the time intervals, calculating respective time delays relative to the first pulse signal segment for each remaining pulse signal segment of the plurality of pulse signal segments, aligning each remaining pulse signal segment with the first pulse signal segment based on the respective time delays to create time-aligned pulse signal segments, and averaging the time-aligned pulse signal segments to establish a prototype pulse signal.

In another example, computer-readable media storing instructions executable by one or more signal processors, wherein the instructions, when executed, cause the one or more signal processors to perform functions comprising receiving energy wave data, detecting a plurality of repetitive pulse signals carried in the energy wave data, wherein at least one aspect of each of the plurality of repetitive pulse signals repeats over a time period at a plurality of arrival times, estimating time intervals based on differences in the plurality of arrival times, wherein the time intervals correspond to occurrences of the plurality of repetitive pulse signals, extracting a plurality of pulse signal segments detected by the one or more signal processor during each of the time intervals over the time period, selecting a first pulse signal segment of the plurality of pulse signal segments received during one of the time intervals, calculating respective time delays relative to the first pulse signal segment for each remaining pulse signal segment of the plurality of pulse signal segments, aligning each remaining pulse signal segment with the first pulse signal segment based on the respective time delays to create time-aligned pulse signal segments, and averaging the time-aligned pulse signal segments to establish a prototype pulse signal.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for developing a prototype pulse signal in real-time based on extracted pulse signal segments during time intervals are described. More specifically, example methods and systems are directed to detecting a repetitive pattern in pulse signals carried in an electrical signal, estimating time intervals of the occurrences of the repetitive pulse signals, and extracting pulse signal segments detected during the time intervals. Extraction of the pulse signal segments detected during specific time segments allows for time adjustment and alignment of the pulse signal segments. Once the pulse signal segments are time-aligned, the pulse signal segments may be averaged to establish the prototype pulse. This prototype pulse may be stored on the signal processor and used for downstream processing of incoming signal pulses.

Figure 1:
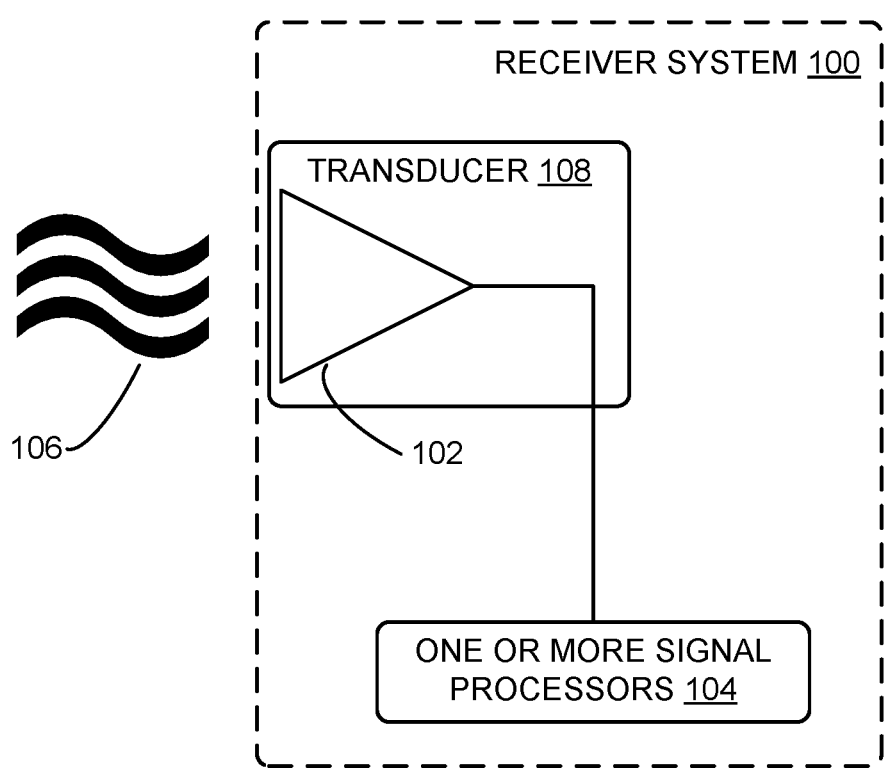
FIG. 1 is a block diagram of an example receiver system, according to an example implementation.

Referring now to the figures, FIG. 1 is a block diagram of a receiver system 100. A receiver system 100 is a system configured to receive energy waves 106 and process these energy waves to identify desired information carried in the energy waves. An energy wave 106 is a disturbance that propagates through at least one medium while carrying energy. For example, an energy wave 106 may propagate through at least one of a liquid, a gas, plasma, a solid, a vacuum, air, space, and some other suitable type of medium. Energy waves 106 include, but are not limited to, electromagnetic waves, radio waves, microwaves, sound waves, ultrasound waves, mechanical waves, shock waves, and/or other suitable types of energy waves.

The receiver system 100 may include a signal processor 104 and a transducer 108. A transducer 108 may be any device configured to convert one type of energy into another type of energy. The transducer 108 may be configured to receive energy waves 106 and convert these energy waves 106 into an electrical signal. The transducer 108 may comprise one or more antennas 102 and may transmit information to the signal processor 104. The signal processor 104 processes the electrical signal generated by a transducer 108 to obtain desired information from the electrical signal. The desired information includes information about signals carried in the energy waves 106.

Energy waves 106 may carry repetitive signals. A repetitive signal is a signal that has a time period over which some aspect of the signal repeats. Repetitive signals are used in timing operations, synchronization operations, radar operations, sonar operations, and other suitable operations.

The receiver system 100 may take a number of different forms. For example, without limitation, a receiver system may be part of a system selected from one of a global positioning system (GPS), a weather radar system, a radar system, a radio system, a sonar system, and some other suitable type of system.

Figure 2:
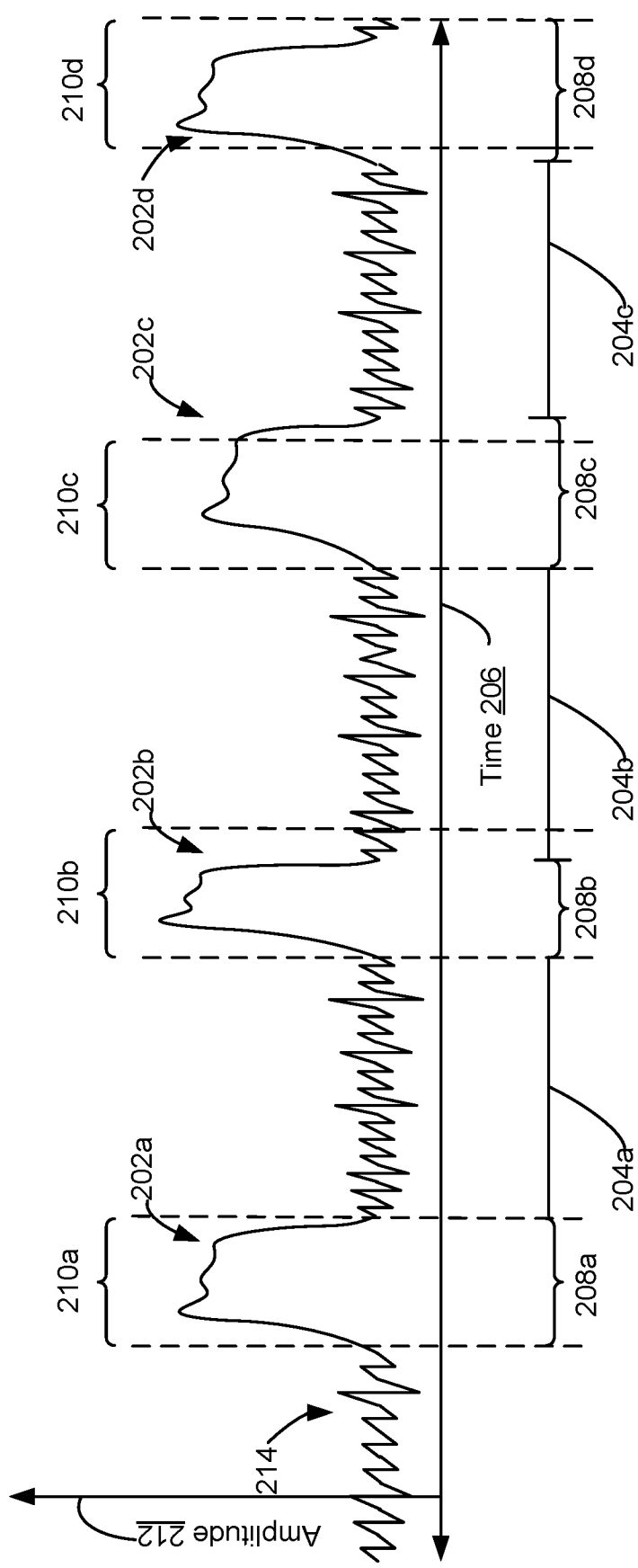
FIG. 2 is an example graph of pulse signals received by an antenna, according to an example implementation.

Referring now to FIG. 2, an example illustration of a graph of pulse signals received by the receiver system 100, according to an example implementation.

Energy waves 106 may carry signal 214. In this illustrative example, the signal 214 take the form of repetitive pulse signals 202a-202d over a time period 206. A repetitive signal is a signal having a time period over which some aspect of the signal repeats. In other words, a repetitive signal is a signal in which a portion of the signal repeats. This portion may also be referred to as a repetitive portion of the signal.

In different embodiments, repetitive portions take a number of different forms. In one illustrative example, the repetitive sequence of repetitive pulse signals 202a-202d may be a wave form that repeats over time. This repetitive sequence of pulses may include any number of signal pulses. In another example embodiment, a repetitive portion may be oscillation of a sine wave that repeats over time.

In some embodiments, repetitive pulse signals 202a-202d may not be identical. For example, the amplitude 212 may vary between the repetitive pulse signals 202a-202d. In another example, the pulse width 208a-208b may vary between the repetitive pulse signals 202a-202d. Many other examples are possible. This variation in repetitive pulse signals 202a-202d may, for example, be due to noise and/or angle of the received signal.

The repetitive pulse signals 202a-202d may arrive at the antenna 102 at different times. In an illustrative example, the differences in arrival times for each of the repetitive pulse signals 202a-202d may be substantially similar. For example, the difference in arrival times of pulse signals 202a and 202b may be substantially similar to the difference in arrival times of pulse signals 202b and 202c. Further, there may be rest time 204a-204c between arrival of the repetitive pulse signals 202a-202d. A rest time 204a-204c may, for example, be the time between the fall of pulse signal 202a and the arrival of pulse signal 202b. During rest times 204a-204c, signals detected in the energy waves may, for example, be noise.

The signal processor 104 may detect the repetitive pulse signals 202a-202d. Upon detection of the repetitive pulse signals 202a-202d, the signal processor may identify pulse information about the repetitive pulse signals 202a-202d. Pulse information may include values for a number of parameters for the repetitive pulse signals 202a-202d. The parameters identified may include, for example, without limitation, at least one of a pulse width 208a-208d, an arrival time, rest time 204a-c, a frequency, a phase, an amplitude 212, a rise time, a fall time and/or a pulse shape. The parameters may further include information about repetitive aspect of signal 214.

The signal processor 104 may establish time intervals 210a-210d for pulse signal extraction based on the identified pulse information. The time intervals 210a-210d are an approximation of the pattern of when the repetitive pulse signals 202a-202d are received and/or detected. In an illustrative embodiment, the time intervals 210a-210d may be established based on differences in the arrival times of the repetitive pulse signals 202a-202d. Further, the time intervals 210a-210d may exclude rest times 204a-204c.

In an illustrative example, time intervals 210a-210d may be determined by first averaging differences in arrival times, pulse widths 208a-208d, and rest times 204a-c of the repetitive pulse signals 202a-202d. The average difference in arrival times may be a time interval cycle. Then, the average pulse width may determine the length of the time intervals 210a-210d in which pulse signal segments will later be extracted. Further, time intervals 210a-210d may exclude the average rest time between the repetitive pulse signals 202a-202d.

Figure 3:
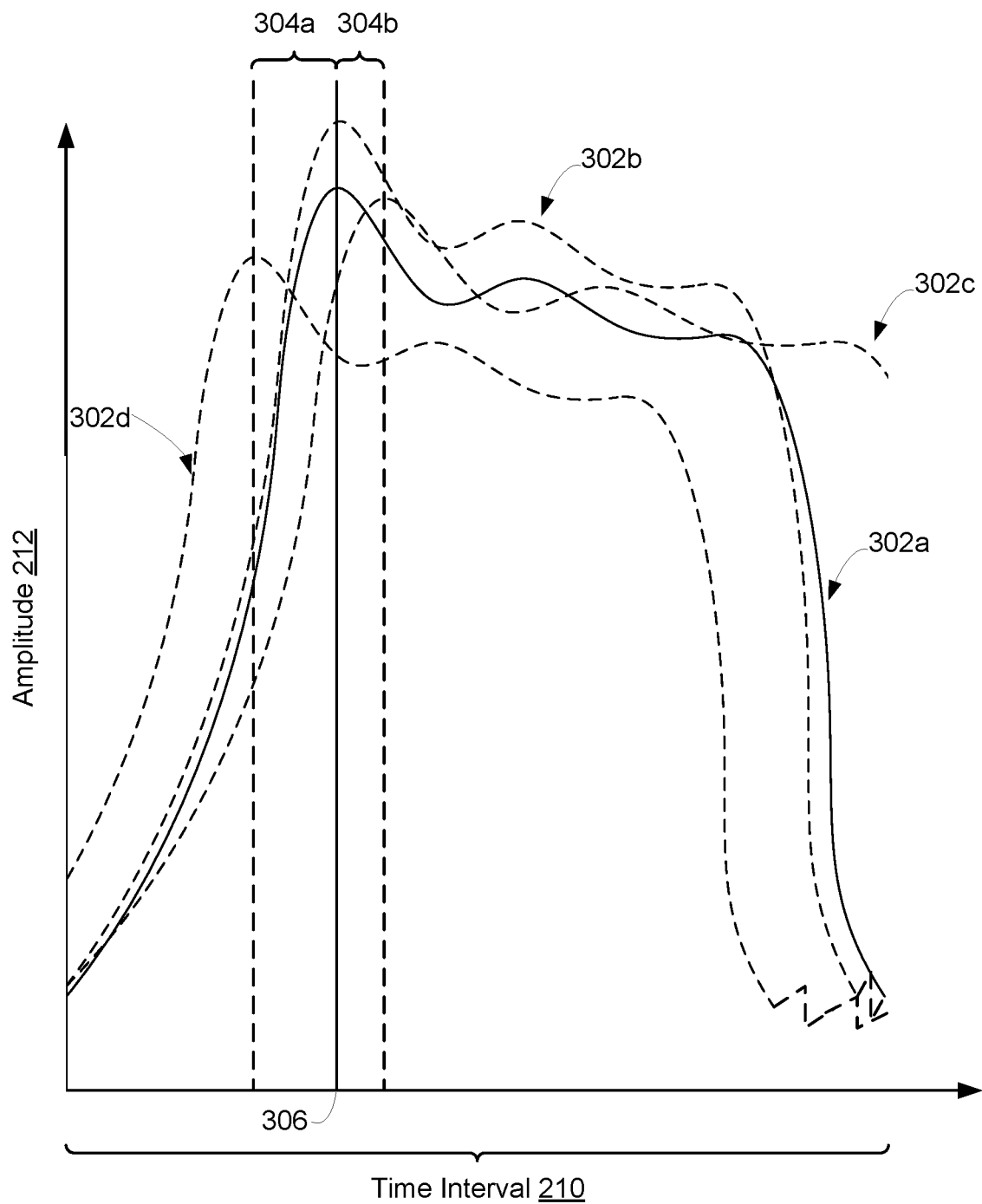
FIG. 3 is an example graph illustrating extracted pulse signal segments, according to an example implementation.

Now referring to FIG. 3, an example graph illustrating extracted pulse signal segments, according to an example implementation. Using, the time interval estimates, the signal processor 104 may extract pulse signal segments 302a-302d detected by the signal processor 104 during each of the time intervals 210a-210d over a time period.

More specifically, the signal 214 received during each of the time intervals 210a-210d is extracted by the signal processor 104. Because the time intervals 210a-210d are estimates and the repetitive pulse signals 202a-202d may not be identical, only a portion of the repetitive pulse signals 202a-202d may have been detected during any given time interval. The pulse signal segments 302a-302d are the portions of the repetitive pulse signals 202a-202d received during each of the time intervals 210a-210d. Further, for similar reasons, the pulse signal segments 302a-302d may not be time-aligned.

In order to establish a more accurate prototype pulse signal, the signal processor 104 may time-align the pulse signal segments 302a-302d. Namely, the signal processor 104 may select a first pulse signal segment 302a received during one of the time intervals. In an example, the signal processor 104 may select the first pulse signal segment received during the time period as first pulse signal segment 302a. In alternative embodiments, the first pulse signal segment may be selected at random. In other example embodiments, the first pulse signal segment may be selected by identifying a desirable attribute within the pulse information, such as a median peak amplitude as compared to the remaining pulse signal segments 302b-302d.

The signal processor 104 may then calculate respective time delays 304a-304b relative to the first pulse signal segment 302a for each remaining pulse signal segments 302b-302d of the extracted pulse signal segments 302a-302d. In one example, the remaining pulse signal segments 302b-302d may each be cross-correlated with the first pulse signal segment 302a to determine time delays with respect with respected to the first pulse signal segment 302a. In another example, the signal processor 104 may calculate the time offset or delay of the repetitive aspect of the pulse signal segments 302a-302d based on the time of the occurrence of the repetitive aspect 306.

By way of example, the estimated time interval 210 may be 10 milliseconds (ms). In some example embodiments, the signal processor 104 may determine a maximum amplitude, or peak, for each of the pulse signal segments 302a-302d and calculate each time delay based on the pulse signal segment 302a-302d peaks. The maximum amplitude of the first pulse signal segment 302a may be measured at 3 ms. The maximum amplitude of the remaining pulse signal segments 302b, 302c, and 302d may be measured at 3 ms, 3.5 ms, and 2 ms, respectively. The resulting time delays would be 0 ms, 0.5 ms, and −1 ms, respectively.

In some example embodiments, the signal processor 104 may only extract pulse signal segments 302a-302d detected during the time period in which the signal data was used to estimate time intervals 210a-210d. In alternative embodiments, the signal processor 104 may continue to extract pulse signal segments detected during a later time period. For example, the time intervals 210a-210d may be estimated using signal 214 over a 30 ms time period. The signal processor 104 may extrapolate time intervals over the next 10 minutes to extract a greater number pulse signal segments.

Some extracted signal data may not be useful for inclusion in determining a prototype pulse. For example, extracted signal data during one time interval may only include noise. Conversely, extracted signal data during another time interval may include a signal strong enough to saturate the receiver system 100. As such, in some embodiments, the signal processor may only calculate respective time delays for pulse signal segments where a peak amplitude falls between certain upper and lower amplitude thresholds. The amplitude thresholds define an upper limit amplitude value and a lower limit amplitude value.

The signal processor 104 may establish amplitude thresholds based on the identified amplitude values of the repetitive pulse signals 202a-202d or the extracted pulse signal segments 302a-302d. For example, if 90% of the peaks of the extracted pulse signal segments 302a-302d are within an amplitude range, the signal processor may set the lower limit amplitude value and the upper limit amplitude value based on the amplitude range.

Outlying pulse signal segments are extracted pulse signal segments with peak amplitudes outside of the amplitude range (i.e., a maximum amplitude below the lower limit amplitude value or a maximum amplitude above the upper limit amplitude value). In calculating the respective time delays, the signal processor 104 may exclude any outlying pulse signal segments.

Figure 4:
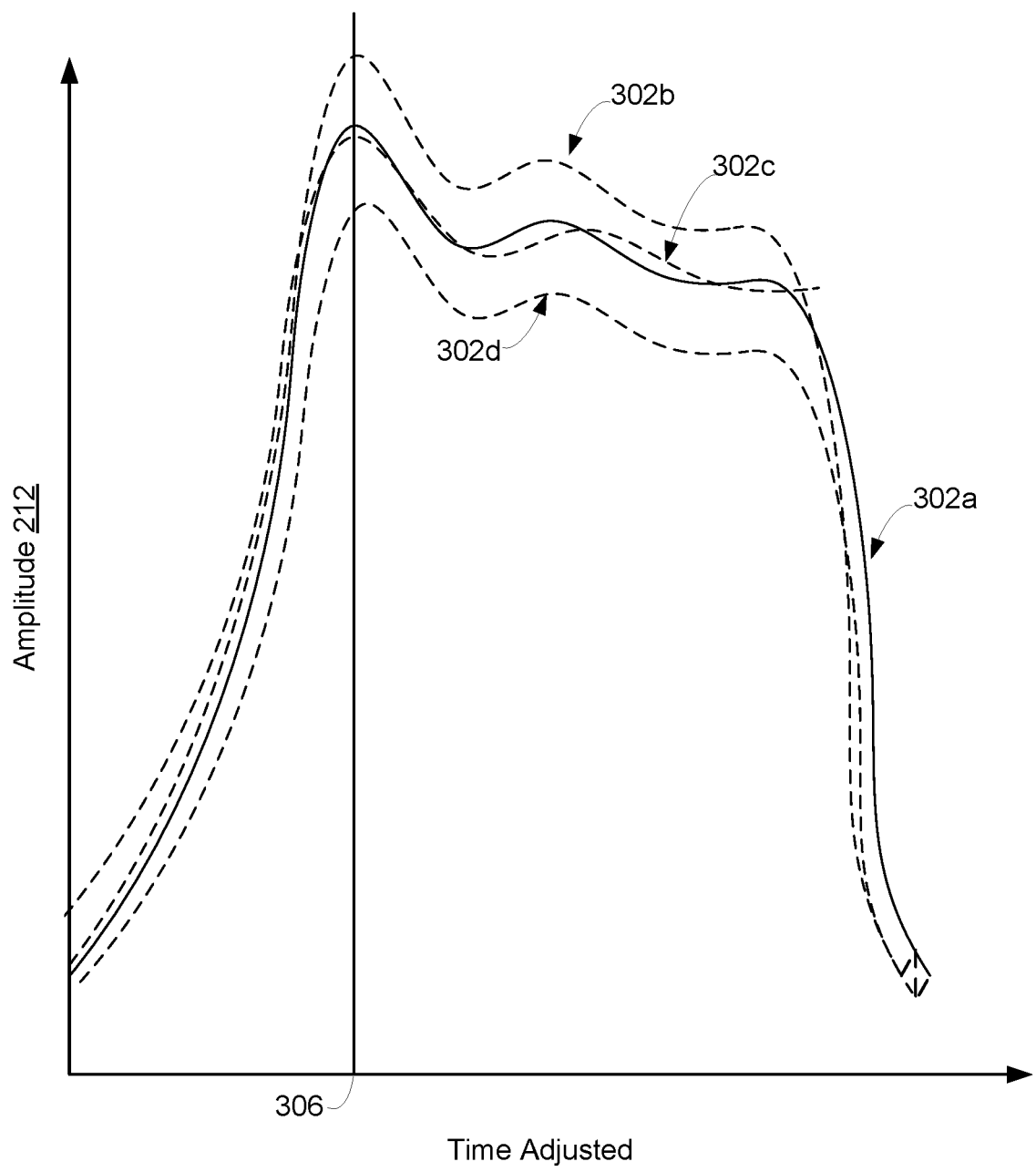
FIG. 4 is an example graph illustrating time-aligned extracted pulse signal segments, according to an example implementation.

Referring now to FIG. 4, an example graph illustrating time-aligned extracted pulse signal segments, according to an example implementation. The signal processor 104 may align each remaining pulse signal segment 302b-302d with the first pulse signal segment 302a based on the respective time delays 304a-304b to create time-aligned pulse signal segments. As described above, the time-aligned pulse signal segments may only include extracted pulse signal segments with peak amplitudes falling within the amplitude thresholds.

Figure 5:
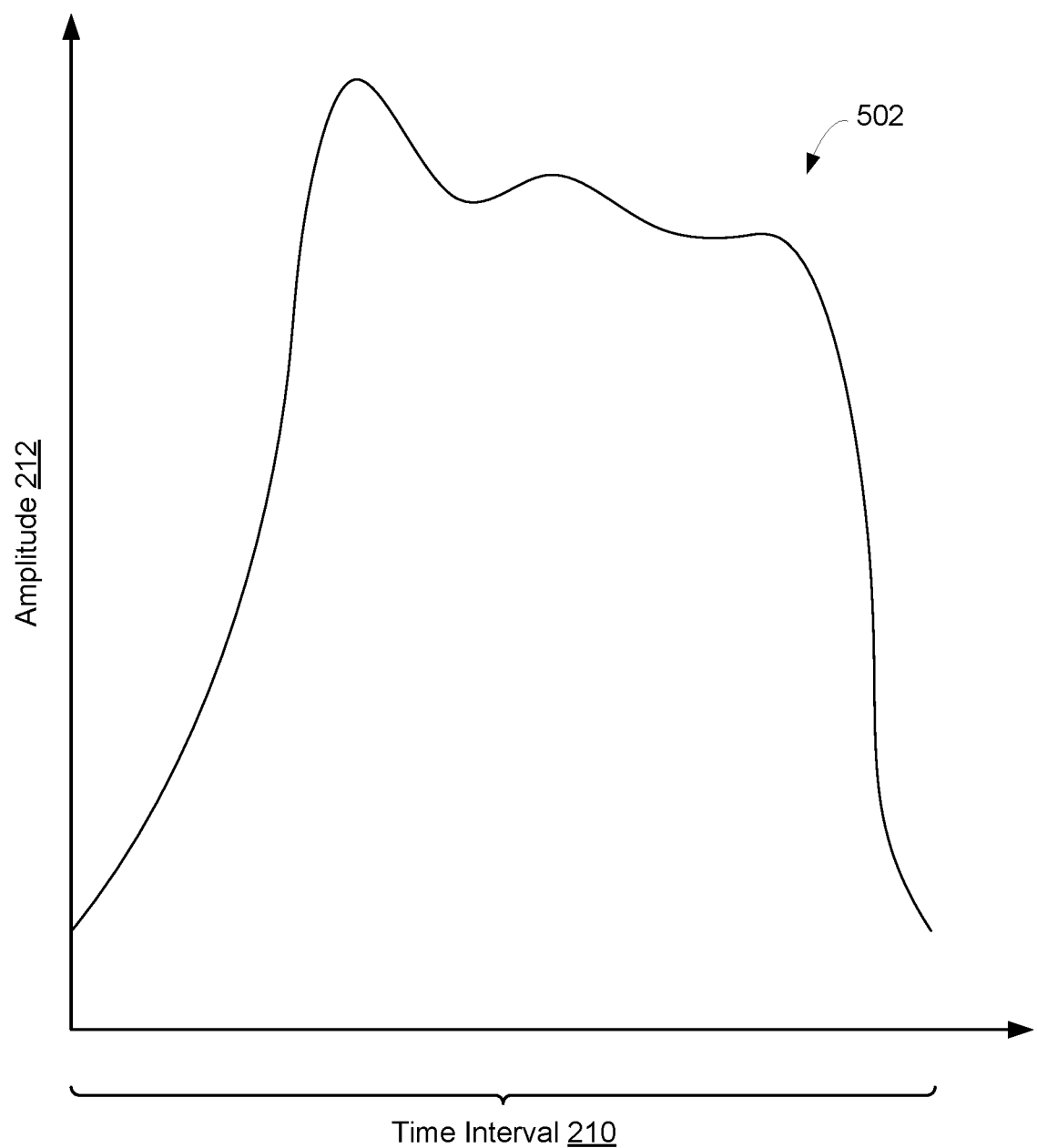
FIG. 5 is an example graph illustrating a prototype pulse signal, according to an example implementation.

Referring now to FIG. 5, an example graph illustrating a prototype pulse signal, according to an example implementation. The signal processor 104 may compute an average of the time-aligned pulse signal segments 302a-302d to establish a prototype pulse signal 502.

This prototype pulse signal 502 may be stored on the signal processor 104 and used for down-stream processing to maximize the signal-to-noise ratio for incoming signal pulses, for example, by applying a finite impulse response filter, such as a matched filter. Matched filters perform coherent correlation of direct and echo signal energy in order to further improve the signal-to-noise ratio of a signal over background noise. The matched filters are provided with the prototype pulse signal structure impulse response for implementation in the matched filter/correlator.

In some examples, the signal processor may identify pulse information about the prototype pulse signal including values for a number of parameters. The parameters may be later used in the matched filter correlation and may include at least one of a rise-time, an amplitude, a pulse width, a fall time, a pulse frequency, and a pulse shape.

At a later time, the signal processor 104 may detect an individual pulse signal carried in the energy waves received at the antenna 102 including the at least one aspect of the repetitive pulse signals. The signal processor 104 may apply the matched filter to the individual pulse signal to maximize a signal to noise ratio of the individual pulse signal.

Figure 6:
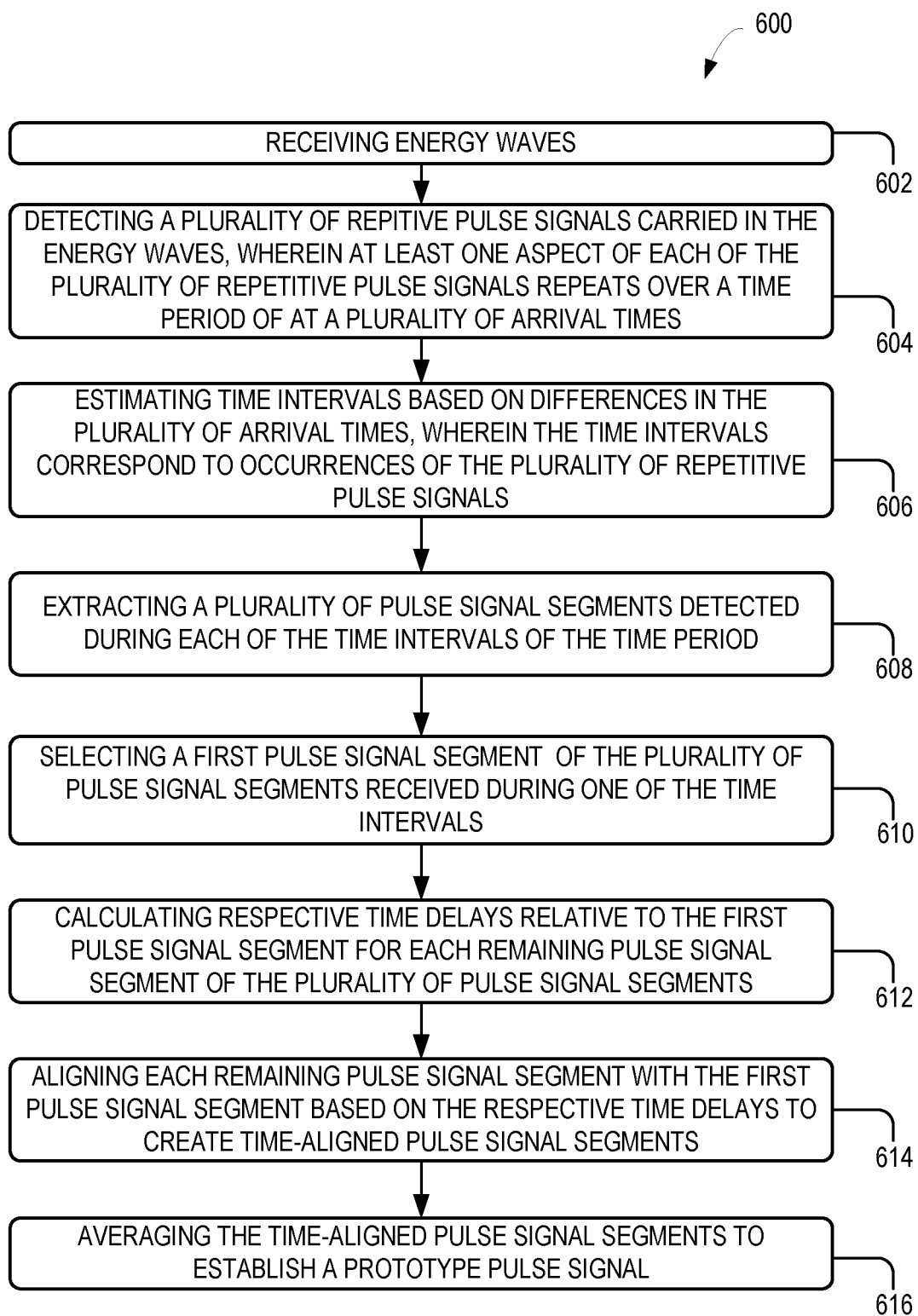
FIG. 6 shows a flowchart of an example method of developing a prototype pulse signal based on extracted pulse signal segments, according to an example implementation.

Referring now to FIG. 6, a flowchart of an example of a method 600 of developing a prototype pulse signal 502 based on extracted pulse signal segments 302a-302d, according to an example implementation. Method 600 shown in FIG. 6 presents an example of a method that could be used with a receiver system 100 shown in FIG. 1. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 600 may include one or more operations, functions, or actions as illustrated by one or more of blocks 602-638. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 includes receiving energy waves at, for example, the receiver system 100 and/or the antenna 102.

At block 604, the method 600 includes detecting, by a signal processor, a plurality of repetitive pulse signals carried in the energy waves received at the antenna, wherein at least one aspect of each of the plurality of repetitive pulse signals repeats over a time period at a plurality of arrival times.

At block 606, the method 600 includes estimating, by the signal processor, time intervals based on differences in the plurality of arrival times, wherein the time intervals correspond to occurrences of the plurality of repetitive pulse signals.

Figure 7:
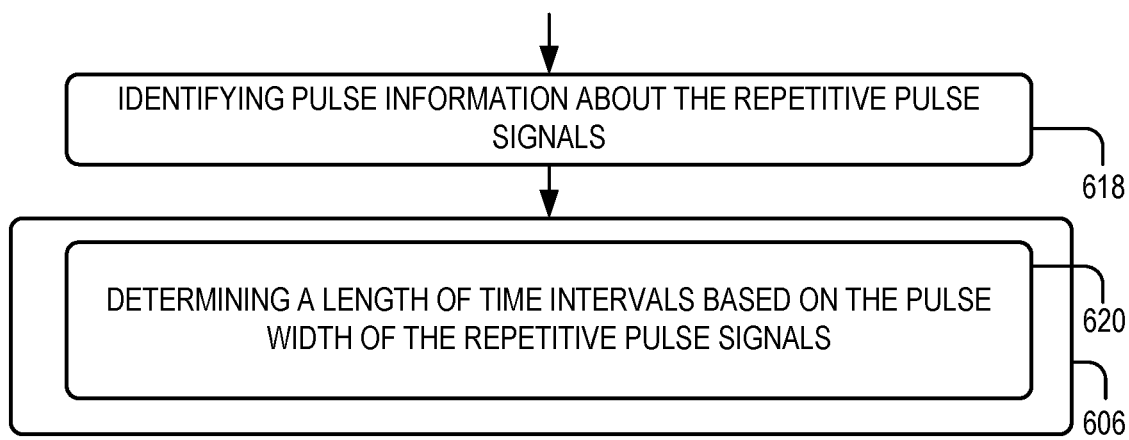
FIG. 7 shows a flowchart of an example method for performing the pulse signal extraction function of the method of FIG. 6, according to an example implementation.

FIG. 7 shows a flowchart of an example method for performing the estimating time intervals, as shown in block 606, according to an example implementation. At block 618, method 600 may further include identifying, by the signal processor, pulse information about the repetitive pulse signals in which the pulse information includes values for a number of parameters for the repetitive pulse signals, wherein the parameters include pulse width of the repetitive pulse signals. At block 620, estimating, by the signal processor, time intervals based on differences in the plurality of arrival times further comprises determining a length of the time intervals based on the pulse width of the repetitive pulse signals.

Figure 8:
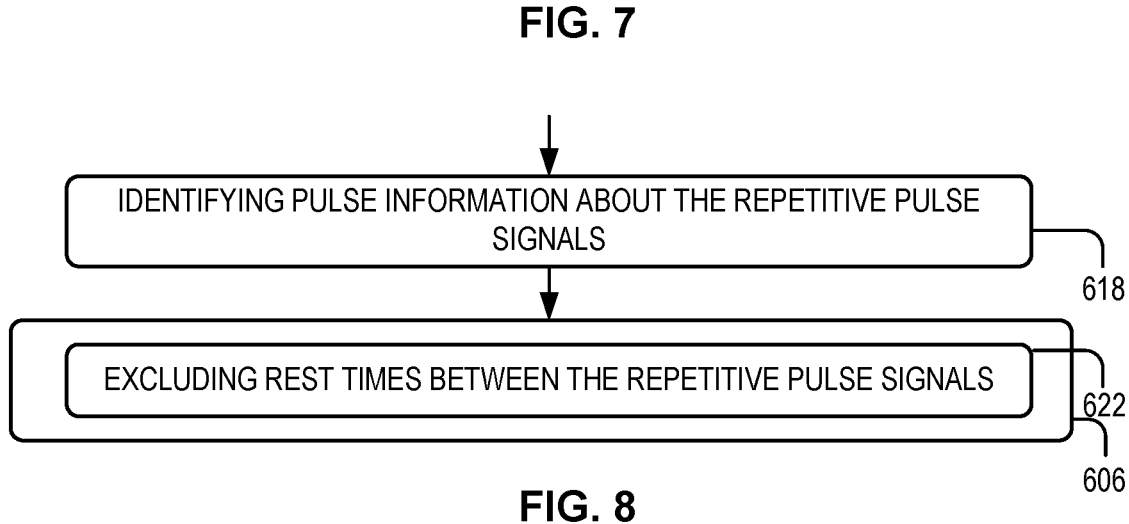
FIG. 8 shows a flowchart of an example method for performing the pulse signal extraction function of the method of FIG. 6, according to an example implementation.

FIG. 8 shows a flowchart of an example method for performing the estimating time intervals, as shown in block 606, according to an example implementation. At block 618, the method includes identifying, by the signal processor, pulse information about the repetitive pulse signals in which the pulse information includes values for a number of parameters for the repetitive pulse signals, wherein the parameters include rest time between the repetitive pulse signals. At block 622, estimating, by the signal processor, time intervals based on differences in the plurality of arrival times further comprises excluding rest times between the repetitive pulse signals.

Any of the method steps as described in FIGS. 7-8 can be used for the method 600, either alone or in any combination, to trigger following functions of the method 600.

Returning to FIG. 6, at block 608, method 600 includes extracting, by the signal processor, a plurality of pulse signal segments detected by the signal processor during each of the time intervals over the time period.

At block 610, the method 600 includes selecting, by the signal processor, a first pulse signal segment of the plurality of pulse signal segments received during one of the time intervals.

At block 612, the method 600 includes calculating, by the signal processor, respective time delays relative to the first pulse signal segment for each remaining pulse signal segment of the plurality of pulse signal segments.

Figure 9:
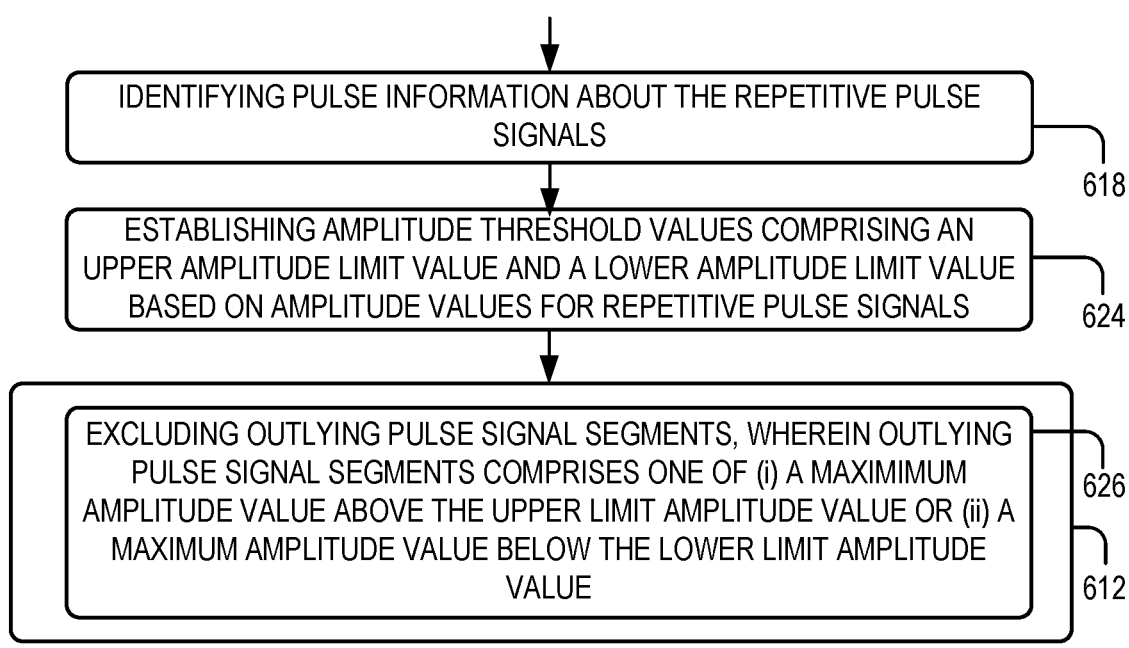
FIG. 9 shows a flowchart of an example method for performing the pulse signal extraction function of the method of FIG. 6, according to an example implementation.

FIG. 9 shows a flowchart of an example method for calculating respective time delays, as shown in block 612, according to an example implementation. At block 618, method 600 further includes identifying, by the signal processor, pulse information about the repetitive pulse signals in which the pulse information includes values for a number of parameters for the repetitive pulse signals, wherein the parameters include amplitude of the repetitive pulse signals. At block 624, method 600 includes establishing, by the signal processor, amplitude threshold values comprising an upper limit amplitude value and a lower limit amplitude value based on amplitude values of the repetitive pulse signals. At block 626, calculating, by the signal processor, respective time delays relative to the first pulse signal segment for each remaining pulse signal segment of the plurality of pulse signal segments comprises excluding, by the signal processor, outlying pulse signal segments, wherein outlying pulse signal segments comprise one of (i)

a maximum amplitude value above the upper limit amplitude value, or (ii) a maximum amplitude value below the lower limit amplitude value.

Figure 10:
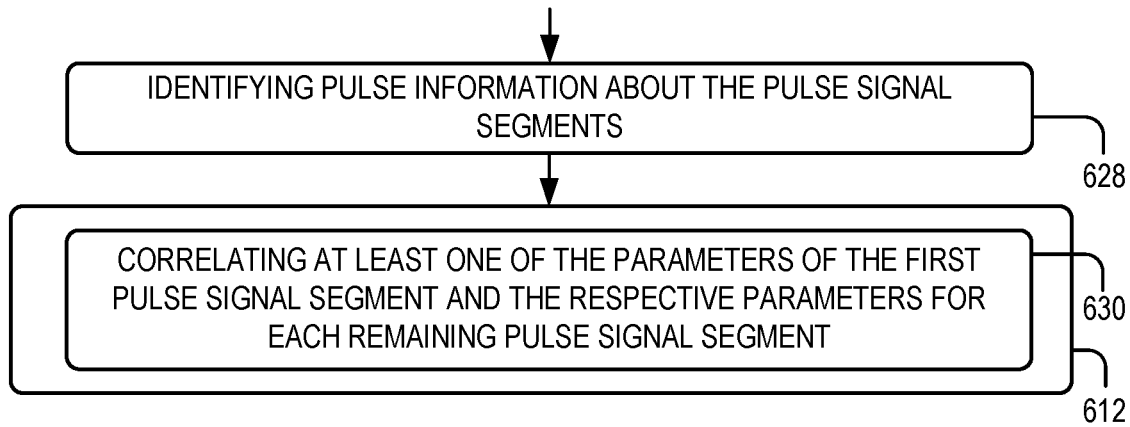
FIG. 10 shows a flowchart of an example method for performing the pulse signal extraction function of the method of FIG. 6, according to an example implementation.

FIG. 10 shows a flowchart of an example method for performing the calculating respective time delays, as shown in block 612, according to an example implementation. At block 628, method 600 further includes identifying, by the signal processor, pulse information about the pulse signal segments, wherein the pulse information includes values for a number of parameters, and wherein the parameters include at least one of a rise-time, a maximum amplitude, a pulse width, a fall time, a pulse frequency, and a pulse shape. At block 630, calculating, by the signal processor, respective time delays relative to the first pulse signal segment for each remaining pulse signal segment of the plurality of pulse signal segments further comprises correlating at least one of the parameters of the first pulse signal segment and the respective parameters for each remaining pulse signal segment.

Any of the method steps as described in FIGS. 9-10 can be used for the method 600, either alone or in any combination, to trigger following functions of the method 600.

Returning to FIG. 6, at block 614, the method 600 includes aligning, by the signal processor, each remaining pulse signal segment with the first pulse signal segment based on the respective time delays to create time-aligned pulse signal segments.

At block 616, the method 600 includes averaging, by the signal processor, the time-aligned pulse signal segments to establish a prototype pulse signal.

Figure 11:
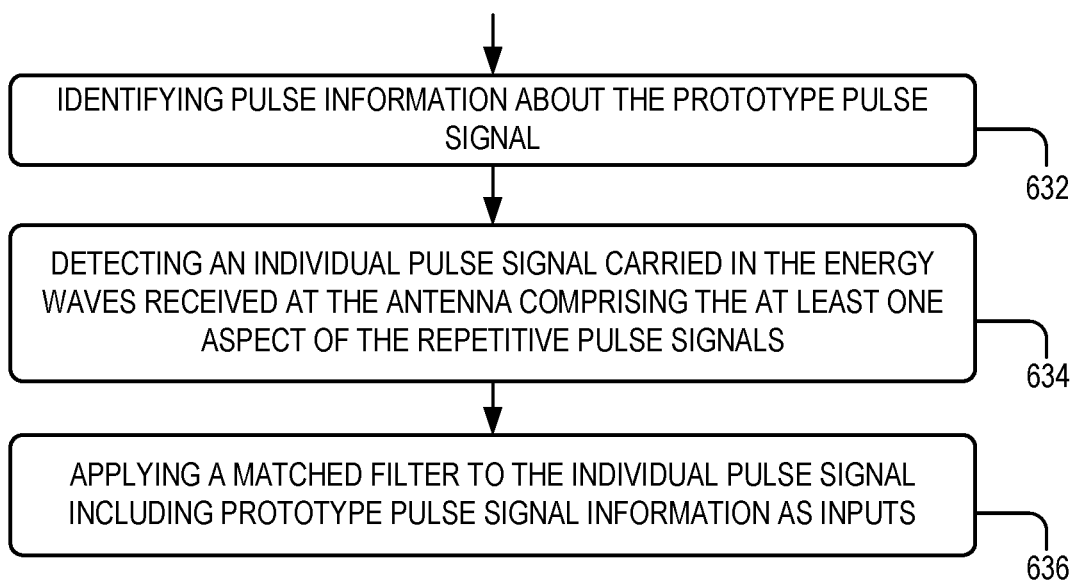
FIG. 11 shows a flowchart of an example method for performing the pulse signal extraction function of the method of FIG. 6, according to an example implementation.

FIG. 11 shows an example method for use with the method 600. At block 632, the method includes identifying, by the signal processor, pulse information about the prototype pulse signal, wherein the pulse information includes values for a number of parameters, and wherein the parameters include at least one of a rise-time, an amplitude, a pulse width, a fall time, a pulse frequency, and a pulse shape. At block 634, the method includes detecting, by the signal processor, an individual pulse signal carried in the energy waves received at the antenna, wherein the individual pulse signal comprises the at least one aspect of the repetitive pulse signals. At block 636, the method includes applying, by the signal processor, a matched filter to the individual pulse signal, wherein input values for the matched filter include at least one of the parameters of the prototype pulse signal to maximize a signal to noise ratio of the individual pulse signal.

Figure 12:
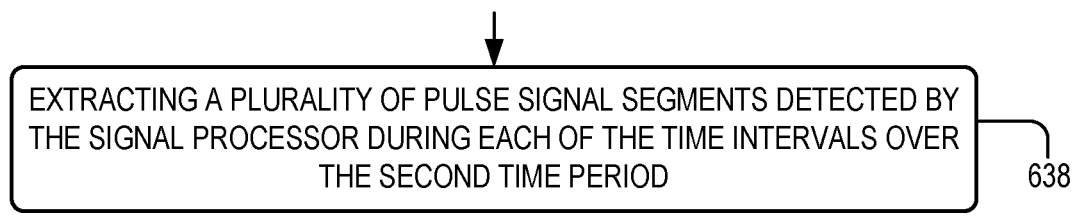
FIG. 12 shows a flowchart of an example method for performing the pulse signal extraction function of the method of FIG. 6, according to an example implementation.

FIG. 12 shows an example method for use with the method 600. At block 638, the method includes extracting, by the signal processor, a plurality of pulse signal segments detected by the signal processor during each of the time intervals over the second time period.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
   receiving, by an antenna, energy waves;
   detecting, by a signal processor, a plurality of repetitive pulse signals carried in the energy waves received at the antenna, wherein at least one aspect of each of the plurality of repetitive pulse signals repeats over a time period at a plurality of arrival times;
   estimating, by the signal processor, time intervals based on differences in the plurality of arrival times, wherein the time intervals correspond to occurrences of the plurality of repetitive pulse signals;
   extracting, by the signal processor, a plurality of pulse signal segments detected by the signal processor during each of the time intervals over the time period;
   selecting, by the signal processor, a first pulse signal segment of the plurality of pulse signal segments received during one of the time intervals;
   calculating, by the signal processor, respective time delays relative to the first pulse signal segment for each remaining pulse signal segment of the plurality of pulse signal segments;
   aligning, by the signal processor, each remaining pulse signal segment with the first pulse signal segment based on the respective time delays to create time-aligned pulse signal segments; and
   averaging, by the signal processor, the time-aligned pulse signal segments to establish a prototype pulse signal.

2. The method of claim 1, wherein the time period is a first time period, and wherein during a second time period after the first time period, the method further comprises:
   identifying, by the signal processor, pulse information about the prototype pulse signal, wherein the pulse information includes values for a number of parameters, and wherein the parameters include at least one of a rise-time, an amplitude, a pulse width, a fall time, a pulse frequency, and a pulse shape;
   detecting, by the signal processor, an individual pulse signal carried in the energy waves received at the antenna, wherein the individual pulse signal comprises the at least one aspect of the repetitive pulse signals; and
   applying, by the signal processor, a matched filter to the individual pulse signal, wherein input values for the matched filter include at least one of the parameters of the prototype pulse signal to maximize a signal to noise ratio of the individual pulse signal.

3. The method of claim 1, further comprising:
   identifying, by the signal processor, pulse information about the repetitive pulse signals in which the pulse information includes values for a number of parameters for the repetitive pulse signals, wherein the parameters include pulse width of the repetitive pulse signals; and wherein estimating, by the signal processor, time intervals based on differences in the plurality of arrival times further comprises determining a length of the time intervals based on the pulse width of the repetitive pulse signals.

4. The method of claim 1, further comprising:

identifying, by the signal processor, pulse information about the repetitive pulse signals in which the pulse information includes values for a number of parameters for the repetitive pulse signals, wherein the parameters include rest time between the repetitive pulse signals; and wherein estimating, by the signal processor, time intervals based on differences in the plurality of arrival times further comprises excluding rest times between the repetitive pulse signals.

5. The method of claim 1, further comprising:

identifying, by the signal processor, pulse information about the repetitive pulse signals in which the pulse information includes values for a number of parameters for the repetitive pulse signals, wherein the parameters include amplitude of the repetitive pulse signals;

establishing, by the signal processor, amplitude threshold values comprising an upper limit amplitude value and a lower limit amplitude value based on amplitude values of the repetitive pulse signals; and wherein calculating, by the signal processor, respective time delays relative to the first pulse signal segment for each remaining pulse signal segment of the plurality of pulse signal segments comprises excluding, by the signal processor, outlying pulse signal segments, wherein outlying pulse signal segments comprise one of (i) a maximum amplitude value above the upper limit amplitude value, or (ii) a maximum amplitude value below the lower limit amplitude value.

6. The method of claim 1, further comprising:

identifying, by the signal processor, pulse information about the pulse signal segments, wherein the pulse information includes values for a number of parameters, and wherein the parameters include at least one of a rise-time, a maximum amplitude, a pulse width, a fall time, a pulse frequency, and a pulse shape; and wherein calculating, by the signal processor, respective time delays relative to the first pulse signal segment for each remaining pulse signal segment of the plurality of pulse signal segments further comprises correlating at least one of the parameters of the first pulse signal segment and the respective parameters for each remaining pulse signal segment.

7. The method of claim 1, wherein the time period is a first time, and wherein during a second time period, the method further comprises:

extracting, by the signal processor, a plurality of pulse signal segments detected by the signal processor during each of the time intervals over the second time period.

8. A system comprising:

an antenna, configured to receive energy waves;

a signal processor configured to carry out operations, the operations comprising:

detecting a plurality of repetitive pulse signals carried in the energy waves received at the antenna, wherein at least one aspect of each of the plurality of repetitive pulse signals repeats over a time period at a plurality of arrival times;

estimating time intervals based on differences in the plurality of arrival times, wherein the time intervals correspond to occurrences of the plurality of repetitive pulse signals;

extracting a plurality of pulse signal segments detected by the signal processor during each of the time intervals over the time period;

selecting a first pulse signal segment of the plurality of pulse signal segments received during one of the time intervals;

calculating respective time delays relative to the first pulse signal segment for each remaining pulse signal segment of the plurality of pulse signal segments;

aligning each remaining pulse signal segment with the first pulse signal segment based on the respective time delays to create time-aligned pulse signal segments; and averaging the time-aligned pulse signal segments to establish a prototype pulse signal.

9. The system of claim 8, wherein the time period is a first time period, and wherein during a second time period after the first time period, the operations further comprise:

identifying pulse information about the prototype pulse signal, wherein the pulse information includes values for a number of parameters, and wherein the parameters include at least one of a rise-time, an amplitude, a pulse width, a fall time, a pulse frequency, and a pulse shape;

detecting an individual pulse signal carried in the energy waves received at the antenna, wherein the individual pulse signal comprises the at least one aspect of the repetitive pulse signals; and applying a matched filter to the individual pulse signal, wherein input values for the matched filter include at least one of the parameters of the prototype pulse signal to maximize a signal to noise ratio of the individual pulse signal.

10. The system of claim 8, wherein the operations further comprise:

identifying pulse information about the repetitive pulse signals in which the pulse information includes values for a number of parameters for the repetitive pulse signals, wherein the parameters include pulse width of the repetitive pulse signals; and wherein estimating time intervals based on differences in the plurality of arrival times further comprises determining a length of the time intervals based on the pulse width of the repetitive pulse signals.

11. The system of claim 8, wherein the operations further comprise:

identifying pulse information about the repetitive pulse signals in which the pulse information includes values for a number of parameters for the repetitive pulse signals, wherein the parameters include rest times between the repetitive pulse signals; and wherein estimating time intervals based on differences in the plurality of arrival times further comprises excluding rest times between the repetitive pulse signals.

12. The system of claim 8, wherein the operations further comprise:

identifying pulse information about the repetitive pulse signals in which the pulse information includes values for a number of parameters for the repetitive pulse signals, wherein the parameters include amplitude of the repetitive pulse signals;

establishing amplitude threshold values comprising an upper limit amplitude value and a lower limit amplitude value based on amplitude values of the repetitive pulse signals; and wherein calculating respective time delays relative to the first pulse signal segment for each remaining pulse signal segment of the plurality of pulse signal segments comprises excluding outlying pulse signal segments, wherein outlying pulse signal segments comprise one of (i) a maximum amplitude value above the upper limit amplitude value, or (ii) a maximum amplitude value below the lower limit amplitude value.

13. The system of claim 8, wherein the operations further comprise:

identifying pulse information about the pulse signal segments, wherein the pulse information includes values for a number of parameters, and wherein the parameters include at least one of a rise-time, a maximum amplitude, a pulse width, a fall time, a pulse frequency, and a pulse shape; and wherein calculating respective time delays relative to the first pulse signal segment for each remaining pulse signal segment of the plurality of pulse signal segments further comprises correlating at least one of the parameters of the first pulse signal segment and the respective parameters for each remaining pulse signal segment.

14. The system of claim 8, wherein the time period is a first time period, and wherein during a second time period after the first time period, the operations further comprise:

extracting a plurality of pulse signal segments detected by the signal processor during each of the time intervals over the second time period.

15. A non-transitory computer-readable media storing instructions executable by one or more signal processors, wherein the instructions, when executed, cause the one or more signal processors to perform functions comprising:

receiving energy wave data;

detecting a plurality of repetitive pulse signals carried in the energy wave data, wherein at least one aspect of each of the plurality of repetitive pulse signals repeats over a time period at a plurality of arrival times;

estimating time intervals based on differences in the plurality of arrival times, wherein the time intervals correspond to occurrences of the plurality of repetitive pulse signals;

extracting a plurality of pulse signal segments detected by the one or more signal processors during each of the time intervals over the time period;

selecting a first pulse signal segment of the plurality of pulse signal segments received during one of the time intervals;

calculating respective time delays relative to the first pulse signal segment for each remaining pulse signal segment of the plurality of pulse signal segments;

aligning each remaining pulse signal segment with the first pulse signal segment based on the respective time delays to create time-aligned pulse signal segments; and averaging the time-aligned pulse signal segments to establish a prototype pulse signal.

16. The non-transitory computer-readable media of claim 15, wherein the time period is a first time period, and wherein during a second time period after the first time period, the functions further comprise:

identifying pulse information about the prototype pulse signal, wherein the pulse information includes values for a number of parameters, and wherein the parameters include at least one of a rise-time, an amplitude, a pulse width, a fall time, a pulse frequency, and a pulse shape;

detecting an individual pulse signal carried in the energy wave data, wherein the individual pulse signal comprises the at least one aspect of the repetitive pulse signals; and applying a matched filter to the individual pulse signal, wherein input values for the matched filter include at least one of the parameters of the prototype pulse signal to maximize a signal to noise ratio of the individual pulse signal.

17. The non-transitory computer-readable media of claim 15, wherein the functions further comprise:

identifying pulse information about the repetitive pulse signals in which the pulse information includes values for a number of parameters for the repetitive pulse signals, wherein the parameters include pulse width of the repetitive pulse signals; and wherein estimating time intervals based on differences in the plurality of arrival times further comprises determining a length of the time intervals based on the pulse width of the repetitive pulse signals.

18. The non-transitory computer-readable media of claim 15, wherein the functions further comprise:

identifying pulse information about the repetitive pulse signals in which the pulse information includes values for a number of parameters for the repetitive pulse signals, wherein the parameters include rest times between the repetitive pulse signals; and wherein estimating time intervals based on differences in the plurality of arrival times further comprises excluding rest times between the repetitive pulse signals.

19. The non-transitory computer-readable media of claim 15, wherein the functions further comprise:

identifying pulse information about the repetitive pulse signals in which the pulse information includes values for a number of parameters for the repetitive pulse signals, wherein the parameters include amplitude of the repetitive pulse signals;

establishing amplitude threshold values comprising an upper limit amplitude value and a lower limit amplitude value based on amplitude values of the repetitive pulse signals; and wherein calculating respective time delays relative to the first pulse signal segment for each remaining pulse signal segment of the plurality of pulse signal segments comprises excluding outlying pulse signal segments, wherein outlying pulse signal segments comprise one of (i) a maximum amplitude value above the upper limit amplitude value, or (ii) a maximum amplitude value below the lower limit amplitude value.

20. The non-transitory computer-readable media of claim 15, wherein the time period is a first time period, and wherein during a second time period after the first time period, the functions further comprise:

extracting a plurality of pulse signal segments detected by the one or more signal processors during each of the time intervals over the second time period.

* * * * *